(12) United States Patent
Lee et al.

(10) Patent No.: US 10,378,361 B2
(45) Date of Patent: Aug. 13, 2019

(54) GAS TURBINE BLADE

(71) Applicant: DOOSAN HEAVY INDUSTRIES & CONSTRUCTION CO., LTD., Changwon-si, Gyeongsangnam-do (KR)

(72) Inventors: Ki Don Lee, Yongin-si (KR); Seok Beom Kim, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 64 days.

(21) Appl. No.: 15/678,843

(22) Filed: Aug. 16, 2017

(65) Prior Publication Data

US 2018/0051570 A1 Feb. 22, 2018

(30) Foreign Application Priority Data

Aug. 22, 2016 (KR) .................. 10-2016-0106273

(51) Int. Cl.
*F01D 5/18* (2006.01)
*F02C 3/04* (2006.01)

(52) U.S. Cl.
CPC ............... *F01D 5/186* (2013.01); *F02C 3/04* (2013.01); *F05D 2220/32* (2013.01); *F05D 2240/126* (2013.01); *F05D 2240/129* (2013.01); *F05D 2240/35* (2013.01); *F05D 2250/12* (2013.01); *F05D 2250/14* (2013.01); *F05D 2260/202* (2013.01)

(58) Field of Classification Search
CPC . F01D 5/186; F05D 2250/14; F05D 2260/202
See application file for complete search history.

(56) References Cited

U.S. PATENT DOCUMENTS

| 4,303,374 A | * | 12/1981 | Braddy ................ F01D 5/186 415/115 |
| 4,650,949 A | * | 3/1987 | Field .................... B23H 9/14 219/69.15 |
| 5,062,768 A | * | 11/1991 | Marriage ............. F01D 5/186 29/889.721 |

(Continued)

FOREIGN PATENT DOCUMENTS

| EP | 2696030 A1 | 2/2014 |
| EP | 2799775 A2 | 11/2014 |

(Continued)

OTHER PUBLICATIONS

Extended European Search Report dated Jan. 23, 2018 in European Application No. 17187062.9.

*Primary Examiner* — Sizo B Vilakazi
*Assistant Examiner* — Kevin R Steckbauer
(74) *Attorney, Agent, or Firm* — Invenstone Patent, LLC

(57) ABSTRACT

A gas turbine blade according to an embodiment of the present invention includes a turbine blade provided in a gas turbine; and a plurality of film coolers formed in a section from a leading edge to a trailing edge of the turbine blade, in which the film cooler includes a cooling channel through which cooling air is introduced and formed in an oval shape; and an outlet through which the cooling air passing through the cooling channel is discharged and extending from an extended end of the cooling channel toward an outer side thereof and formed in an oval shape.

13 Claims, 10 Drawing Sheets

(56) References Cited

U.S. PATENT DOCUMENTS

| | | | | |
|---|---|---|---|---|
| 6,630,645 B2* | 10/2003 | Richter | ............... | F01D 5/186 219/121.71 |
| 7,019,257 B2* | 3/2006 | Stevens | ............ | B23K 26/389 219/121.71 |
| 7,553,534 B2* | 6/2009 | Bunker | ............... | F01D 5/186 415/115 |
| 7,997,868 B1* | 8/2011 | Liang | ............... | F01D 5/186 416/97 R |
| 8,066,484 B1* | 11/2011 | Liang | ............... | F01D 5/186 415/115 |
| 8,079,812 B2* | 12/2011 | Okita | ............... | F01D 5/186 416/97 R |
| 8,092,177 B2* | 1/2012 | Liang | ............... | F01D 5/186 416/231 R |
| 8,105,030 B2* | 1/2012 | Abdel-Messeh | ...... | F01D 5/187 416/95 |
| 8,245,519 B1* | 8/2012 | Liang | ............... | F01D 5/186 415/115 |
| 8,608,443 B2* | 12/2013 | Lee | ............... | F01D 5/186 415/115 |
| 8,684,691 B2* | 4/2014 | Lee | ............... | F01D 5/20 416/224 |
| 8,870,535 B2* | 10/2014 | Lacy | ............... | F01D 5/186 416/97 R |
| 8,870,536 B2* | 10/2014 | Lacy | ............... | F01D 5/186 416/97 R |
| 9,017,026 B2* | 4/2015 | Bergholz, Jr. | ........ | F01D 5/186 416/97 R |
| 9,080,451 B2* | 7/2015 | Simpson | ............... | F01D 5/186 |
| 9,279,330 B2* | 3/2016 | Xu | ............... | F01D 5/186 |
| 9,284,844 B2* | 3/2016 | Xu | ............... | F01D 5/186 |
| 9,410,435 B2* | 8/2016 | Xu | ............... | F01D 5/186 |
| 9,416,665 B2* | 8/2016 | Xu | ............... | F01D 5/186 |
| 9,416,971 B2* | 8/2016 | Xu | ............... | F23R 3/06 |
| 9,422,815 B2* | 8/2016 | Xu | ............... | F01D 5/186 |
| 9,732,617 B2* | 8/2017 | Wang | ............... | F01D 5/187 |
| 9,869,186 B2* | 1/2018 | Xu | ............... | F01D 5/186 |
| 9,890,647 B2* | 2/2018 | Chamberlain | ...... | B23H 9/10 |
| 10,221,693 B2* | 3/2019 | Chan | ............... | F01D 5/143 |
| 2003/0127438 A1* | 7/2003 | Richter | ............... | F01D 5/186 219/121.71 |
| 2008/0057271 A1* | 3/2008 | Bunker | ............... | F01D 5/186 428/137 |
| 2008/0286090 A1* | 11/2008 | Okita | ............... | F01D 5/186 415/115 |
| 2010/0040459 A1 | 2/2010 | Ohkita | | |
| 2010/0040478 A1* | 2/2010 | Abdel-Messeh | ...... | F01D 5/187 416/97 R |
| 2010/0068068 A1* | 3/2010 | Liang | ............... | F01D 5/186 416/97 R |
| 2011/0097188 A1* | 4/2011 | Bunker | ............... | F01D 5/186 415/1 |
| 2011/0158820 A1* | 6/2011 | Chamberlain | ...... | B23H 9/10 416/97 R |
| 2011/0300000 A1* | 12/2011 | Beck | ............... | F01D 5/186 416/97 R |
| 2011/0305582 A1* | 12/2011 | Lee | ............... | F01D 5/186 416/97 R |
| 2012/0282108 A1* | 11/2012 | Lee | ............... | F01D 5/20 416/97 R |
| 2013/0183165 A1* | 7/2013 | Lacy | ............... | F01D 5/186 416/97 R |
| 2013/0183166 A1* | 7/2013 | Lacy | ............... | F01D 5/186 416/97 R |
| 2013/0206733 A1* | 8/2013 | Levasseur | ............ | B23H 9/10 219/69.17 |
| 2013/0209227 A1* | 8/2013 | Xu | ............... | F01D 5/186 415/115 |
| 2013/0209228 A1* | 8/2013 | Xu | ............... | F01D 5/186 415/115 |
| 2013/0209229 A1* | 8/2013 | Xu | ............... | F01D 5/186 415/115 |
| 2013/0209233 A1* | 8/2013 | Xu | ............... | F01D 5/186 415/116 |
| 2013/0209234 A1* | 8/2013 | Xu | ............... | F23R 3/06 415/116 |
| 2013/0209235 A1* | 8/2013 | Xu | ............... | F01D 5/186 415/116 |
| 2013/0209236 A1* | 8/2013 | Xu | ............... | F01D 5/186 415/116 |
| 2013/0259705 A1* | 10/2013 | Bergholz, Jr. | ........ | F01D 5/186 416/97 R |
| 2013/0302177 A1* | 11/2013 | Bergholz, Jr. | ........ | F01D 5/187 416/97 R |
| 2014/0003960 A1* | 1/2014 | Simpson | ............ | F01D 5/186 416/97 R |
| 2014/0037429 A1* | 2/2014 | Okita | ............... | F01D 5/186 415/115 |
| 2015/0147158 A1* | 5/2015 | Wang | ............... | F01D 5/187 415/115 |
| 2016/0153283 A1 | 6/2016 | Xu et al. | | |
| 2016/0169004 A1* | 6/2016 | Quach | ............... | F01D 5/186 60/752 |
| 2016/0369633 A1* | 12/2016 | Chan | ............... | F01D 5/143 |

FOREIGN PATENT DOCUMENTS

| | | |
|---|---|---|
| EP | 3034794 A1 | 6/2016 |
| JP | 2011-064207 A | 3/2011 |
| JP | 4794317 B2 | 8/2011 |
| KR | 10-0503582 B1 | 7/2005 |

* cited by examiner

GAS TURBINE BLADE

CROSS-REFERENCE TO RELATED APPLICATION(S)

This application claims priority to Korean Patent Application No. 10-2016-0106273, filed on Aug. 22, 2016, the disclosure of which is incorporated herein by reference in its entirety.

BACKGROUND OF THE INVENTION

Field of the Invention

Exemplary embodiments of the present invention relate to a turbine blade provided in a gas turbine, and more particularly, to a gas turbine blade including a film cooler provided to perform film cooling of the turbine blade by mixing cooling air with hot gas of high temperature that is moved toward the turbine blade.

Description of the Related Art

In general, a gas turbine is an internal combustion engine converting thermal energy into mechanical energy by spraying high-temperature and high-pressure combustion gas that is generated by mixing and combusting fuel and air compressed by high pressure in a compressor to the turbine to rotate the turbine.

In order to configure such a turbine, a configuration in which a plurality of turbine rotor disks having a plurality of turbine blades arranged on an outer circumferential surface thereof are configured in a multi-stage form to pass the high-temperature and high-pressure combustion gas through the turbine blade has been widely used.

The gas turbine blade used as described above generally uses a film cooling method for cooling a surface thereof, which will be described with reference to the accompanying drawings.

Referring to FIG. 1, a turbine blade (not shown) has a plurality of film coolers 7 formed on a surface thereof to cool the surface heated by hot gas supplied to the surface.

The film cooler 7 includes an inlet 7a formed in a circular shape so that cooling air supplied from the inside of the turbine blade is introduced and an extension portion 7b extended toward the outside in a bilaterally symmetrical form at an extended end portion of the inlet 7a.

The inlet 7a has a circular cross section when viewed from the front, thus extends at a specific extension angle α at the extension portion 7b to supply a large amount of cooling air to the surface of the turbine blade. As the extension angle α is increased, a separation phenomenon causing non-uniform flow in the extension portion 7b as illustrated by arrows occurs.

In this case, problems that cooling air sprayed to the surface of the blade is not constantly supplied, but the cooling air is non-uniformly sprayed toward the turbine blade to thereby deteriorate an effect of cooling the surface of the blade occur.

Further, since the inlet 7a has a circular cross section, hoop stress is generated. As a result, deformation or a crack due to stress concentration at a specific position occurs.

SUMMARY OF THE INVENTION

The present invention provides a gas turbine blade capable of improving efficiency of cooling a plurality of turbine blades through stable cooling of the turbine blade by changing a structure of a film cooler provided in the gas turbine blade into an oval shape.

In accordance with one aspect of the present invention, a gas turbine blade comprises: a turbine blade provided in a gas turbine; and a plurality of film coolers formed in a section from a leading edge to a trailing edge of the turbine blade, in which the film cooler includes a cooling channel through which cooling air is introduced and formed in an oval shape; and an outlet extending from one end of the cooling channel to an outer surface of the turbine blade and formed in an oval shape that becomes longer from the one end of the cooling channel to the outer surface of the turbine blade.

The cooling channel and the outlet may extend for the same length.

The cooling channel may extend for a length longer than that of the outlet.

The cooling channel may extend for a length shorter than that of the outlet.

When an opening height of the cooling channel is H, and a width of the cooling channel is W, a ratio of the width W to the height H may be maintained to be 2.5 to 3 times.

The cooling channel and the outlet may be processed to have a smooth inner surface.

A diffusion angle of the outlet extended from a left side and a right side of the cooling channel may be maintained within a range of 10 to 13°.

A width change portion, in which a rear end portion of the cooling channel is connected to a front end portion of the outlet and a width of the film cooler is changed, may include a guide portion positioned in an inside of the cooling channel and extending in a streamline form toward the outlet while being close to a left side and a right side of the width change portion to guide a moving direction of the cooling air moving through the cooling channel to a left side and a right side of the outlet based on a width direction of the outlet.

The guide portion may include a first guide portion extending in a first length while facing a left side surface of the width change portion, and a second guide portion extending in a second length while facing a right side surface of the width change portion.

The first and second guide portions may be disposed to be bilaterally symmetrical with respect to a center in the width direction of the outlet.

The first guide portion may further include a first auxiliary guide portion spaced apart from the first guide portion in a width direction of the width change portion and extending for a length shorter than that of the first guide portion, and the second guide portion may further include a second auxiliary guide portion spaced apart from the second guide portion in the width direction of the width change portion and extending for a length shorter than that of the second guide portion.

A plurality of guide portions may be positioned while being spaced apart from each other at a predetermined interval along a width direction of the width change portion.

The cooling channel may extend so that a height of the cooling channel is decreased toward the outlet.

A plurality of partition walls may be disposed in the cooling channel along a width direction of the cooling channel.

The partition walls may be disposed at a left side position and a right side position along the width direction of the cooling channel in an inlet of the cooling channel while being spaced apart from each other.

The plurality of partition walls may be spaced apart from each other at a center in the width direction of the cooling channel.

The partition wall may be positioned at a central position in the width direction of the cooling channel and extend in a length direction of the cooling channel.

A length of each cooling channel may be decreased from the leading edge toward the trailing edge.

The cooling channel may be provided with a separating plate extending along a length direction of the cooling channel at a position in an inside of the cooling channel that is rounded in an oval shape.

In accordance with another aspect of the present invention, a gas turbine comprises: a combustor provided in front of a turbine blade including a film cooler having an oval shape, and a compressor provided in front of the combustor.

BRIEF DESCRIPTION OF THE DRAWINGS

The above and other features of the present invention will be more clearly understood from the following detailed description taken in conjunction with the accompanying drawings, in which.

DESCRIPTION OF SPECIFIC EMBODIMENTS

Figure 1:
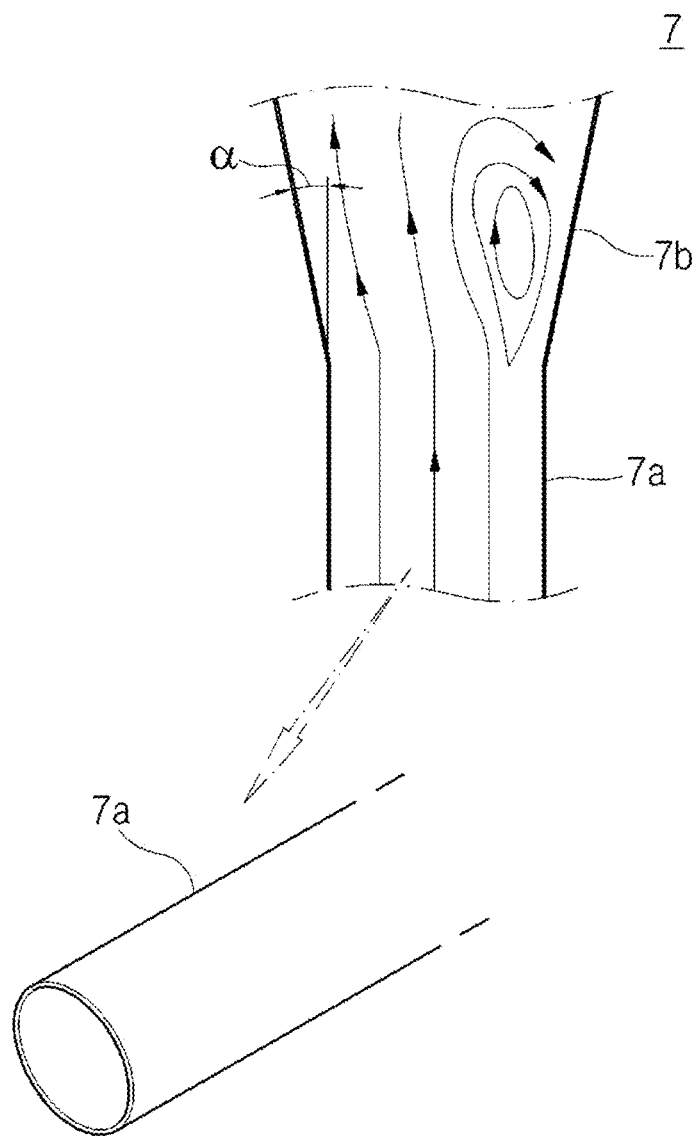
FIG. 1 is a view illustrating a film cooler formed in an existing turbine blade.

Before describing the present invention, a basic technology of a gas turbine will be described.

A gas turbine includes a housing and a diffuser discharging combustion gas passing through the turbine at a rear side of the housing. Further, a combustor combusting compressed air that is supplied thereto is disposed at a front side of the diffuser.

Based on a flow direction of air, a compressor section is positioned at an upstream side of the housing and a turbine section is disposed at a downstream side of the housing. In addition, a torque tube as a torque transfer member transferring rotational torque generated at the turbine section to the compressor section is disposed between the compressor section and the turbine section.

A plurality of compressor rotor disks (e.g. 14) are provided in the compressor section, and the respective compressor rotor disks are connected so as not to be spaced apart from each other in an axial direction by a tie rod.

Specifically, the respective compressor rotor disks are aligned along the axial direction in a state in which the tie rod penetrates through the center thereof. Further, a flange coupled to an adjacent rotor disk so that relative rotation is impossible is formed to protrude in the axial direction in the vicinity of an outer circumferential portion of the compressor rotor disk.

A plurality of blades are radially coupled to an outer circumferential surface of the compressor rotor disk. The respective blades include a dovetail portion to be connected to the compressor rotor disk.

A connection method of the dovetail portion includes a tangential type and an axial type. The connection method may be selected according to a required structure of the gas turbine. In some cases, the blade may be connected to the rotor disk using other connectors except for the dovetail portion.

The tie rod is disposed to penetrate through a central portion of the plurality of compressor rotor disks, and has one end connected in a compressor rotor disk positioned at the uppermost stream and the other end inserted into the torque tube to be fixed.

The tie rod may have various structures according to the gas turbine. That is, as illustrated in the drawing, the tie rod may have a structure in which one tie rod may penetrate through the central portion of the rotor disk or a structure in which a plurality of tie rods may be circumferentially disposed, or both of the structures in combination.

Although not illustrated, in the compressor of the gas turbine, a vane serving as a guide vane may be installed at a position next to the diffuser in order to set a flow angle of fluid introduced into an inlet of the combustor to a designed flow angle after increasing a pressure of the fluid, which is called a deswirler.

The combustor mixes and combusts the compressed air introduced thereinto with fuel to generate high-temperature and high-pressure combustion gas with high energy, and increases a temperature of the combustion gas up to the limit of heat resistance that the combustor and turbine components may withstand by an isobaric combustion process.

The combustor configuring a combustion system of the gas turbine may be provided in plural and arranged in a casing formed in a cell form, and the combustor includes a burner including a fuel spray nozzle, etc., a combustor liner forming a combustion chamber, and a transition piece connecting the combustor and the turbine.

Specifically, the combustor liner provides a combustion space in which the fuel sprayed by the fuel nozzle is mixed with the compressed air of the compressor and combusted. The combustor liner may include a flame tube providing a combustion space in which the fuel mixed with the air is combusted and a flow sleeve forming a ring-shaped space while enclosing the flame tube. Further, the fuel nozzle is coupled to a front end of the combustor liner, and an ignition plug is coupled to a side wall thereof.

Meanwhile, a rear end of the combustor liner is connected to the transition piece so as to transfer the combustion gas combusted by the ignition plug to the turbine side. An outer wall portion of the transition piece is cooled by the compressed air supplied from the compressor to prevent a damage caused by high temperature of the combustion gas.

To this end, the transition piece is provided with holes for cooling to spray air to the inside of the transition piece, and the compressed air cools a main body in the inside through the holes and then flows toward the combustor liner.

In a ring-shaped space of the combustor liner, cooling air cooling the above-described transition piece flows, and the compressed air may be provided as cooling air from the outside of the flow sleeve through cooling holes provided in the flow sleeve to collide with an outer wall of the combustor liner.

Meanwhile, generally in the turbine, high-temperature and high-pressure combustion gas from the combustor expands to give an impulse and reaction force to a rotor blade of the turbine to convert into mechanical energy. The mechanical energy obtained from the turbine is supplied as energy required to compress air in the compressor, and the remainder is used to driving a generator to produce power.

In the turbine, a plurality of stator blades and rotor blades are alternatively disposed in a casing, and the rotor blades are driven by the combustion gas to rotate an output shaft connected to the generator.

To this end, a plurality of turbine rotor disks are provided in the turbine section. The turbine rotor disks each basically have a shape similar to the compressor rotor disk. Therefore, the turbine rotor disk also includes a flange coupled to an adjacent turbine rotor disk, and a plurality of turbine blades radially disposed. The turbine blade may also be coupled to the turbine rotor disk in a dovetail manner.

In the gas turbine having the above-described structure, the introduced air is compressed in the compressor section, combusted in the combustor, transferred to the turbine section to drive the turbine, and discharged into the air through the diffuser.

Figure 2:
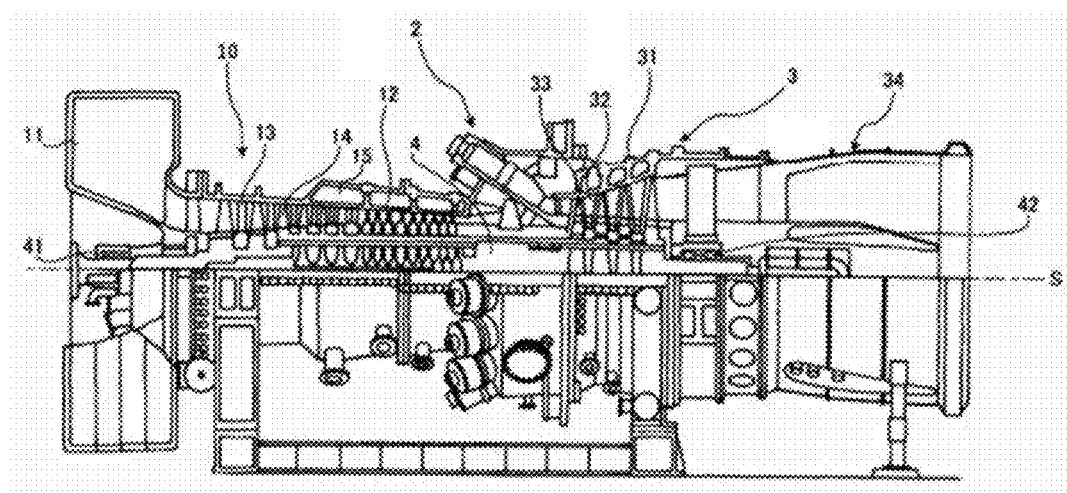
FIG. 2 is a longitudinal cross-sectional view of a gas turbine in which a turbine blade according to the present invention is installed.

An embodiment applied to the gas turbine having above-describe features will be described with reference to the drawings. FIG. 2 is a longitudinal cross-sectional view of a gas turbine in which a turbine blade according to the present invention is installed, FIG. 3 is a perspective view illustrating a gas turbine blade according to an embodiment of the present invention, and FIG. 4 is a perspective view illustrating a film cooler according to an embodiment of the present invention.

Figure 3:
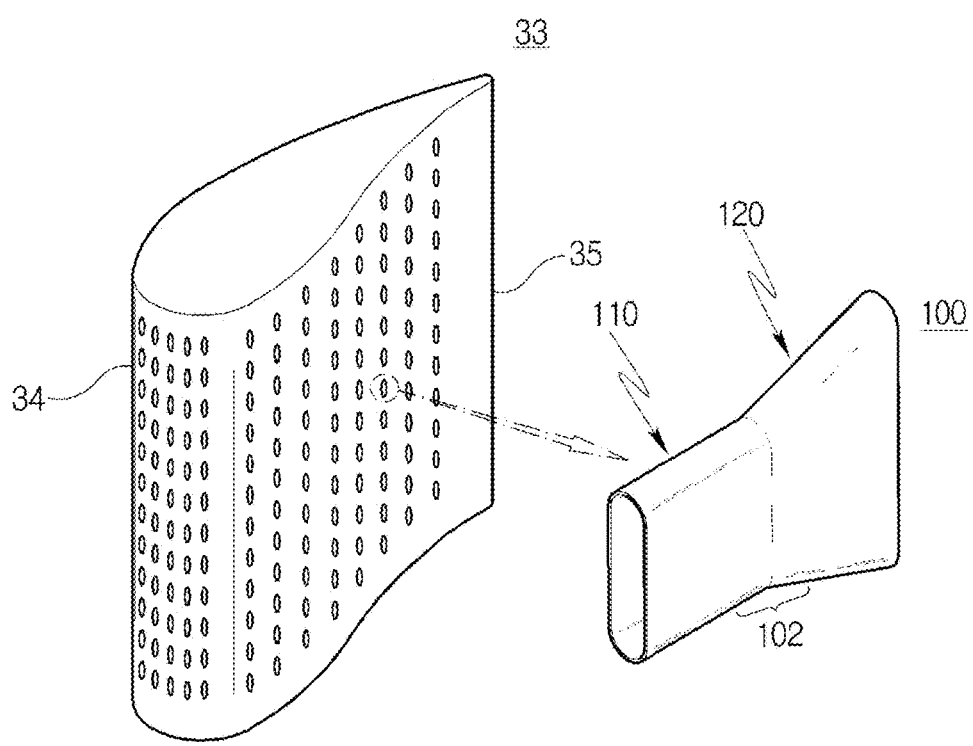
FIG. 3 is a perspective view illustrating a gas turbine blade including a film cooler according to an embodiment of the present invention.
Figure 4:
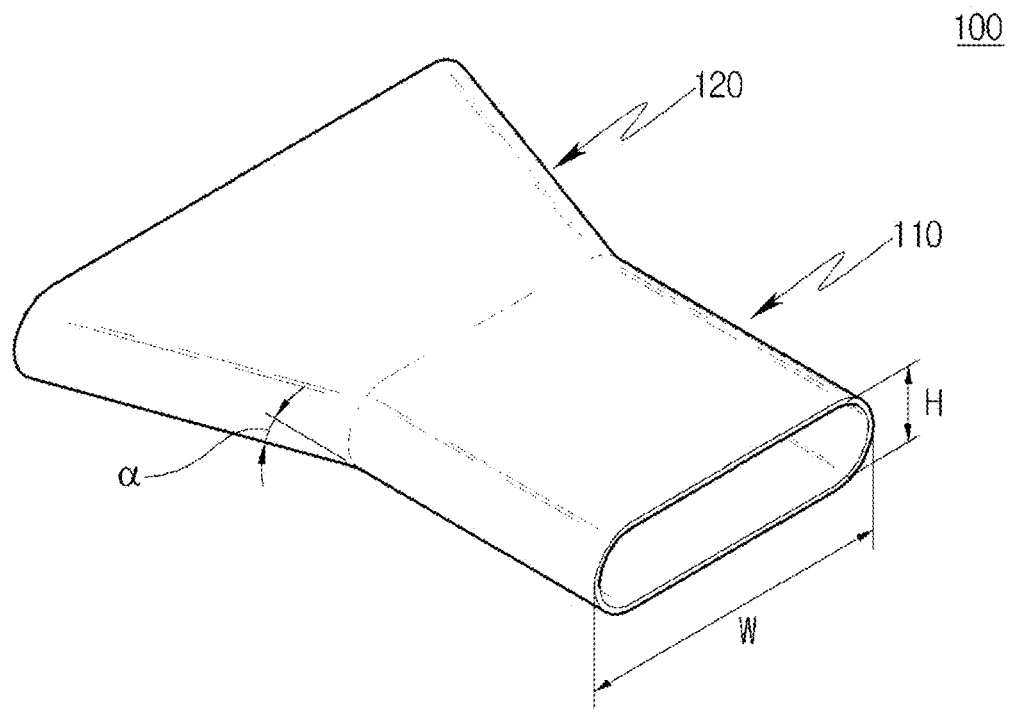
FIG. 4 is a perspective view illustrating a film cooler according to an embodiment of the present invention.

Referring to FIGS. 2 and 3, the gas turbine largely includes a compressor 10, a combustor 2, and a turbine 3. The compressor 10 includes an air inlet 11 through which air is introduced, and a plurality of compressor vanes 13 and compressor blades 14 are alternatively disposed in a compressor casing 12.

The combustor 2 supplies fuel to compressed air compressed in the compressor 10 and ignites with burner to generate high-temperature and high-pressure combustion gas.

In the turbine 3, a plurality of turbine vanes 32 and turbine blades 33 are alternatively disposed in a turbine casing 31. Further, a rotor 4 is disposed to penetrate through a central portion of the compressor 10, the combustor 2, the turbine 3, and a vent chamber 34.

The rotor 4 has a first end positioned at the compressor 10 side and supported by a bearing 41, and a second end positioned at the vent chamber 34 side and supported by a bearing 42. The rotor 4 is rotatably installed based on an axial line S thereof. Further, a plurality of disks are fixed to the rotor 4 to connect respective blades 14 and 33 and at the same time, a driving shaft of a generator (not shown) is connected to the second end located in the vent chamber 34 side.

The air introduced through the air inlet 11 of the compressor 10 is compressed by passing through the plurality of compressor vanes 13 and the compressor blades 14 to be changed into high-temperature and high-pressure compressed air, and the combustor 2 combusts the compressed air by supplying a predetermined fuel to the compressed air.

Further, the high-temperature and high-pressure combustion gas generated in the combustor 2 passes through the plurality of turbine vane 32 and the turbine blade 33 configuring the turbine 3 to rotate the rotor 4 and provide rotation power to the generator connected to the rotor 4 to generate power.

In the gas turbine configured as described above, some of the compressed air compressed in the compressor 10 is extracted by an external pipe from an extraction manifold 15 at a middle stage of the compressor casing 12, and the compressed air (extracted air) is supplied as cooling air to the inside of the turbine casing 31.

Further, a plurality of turbine blades 33 fixed to the rotor 4 side are installed in a ring shape along an outer circumferential surface of the disk, and cooling air is separately supplied from the compressor 10 for cooling.

The turbine blade 33 rotates together with the rotor 4 when the rotor 4 rotates, is provided with a platform (not shown) at a lower side thereof and a dovetail (not shown) at a lower side of the platform (not shown) based on FIG. 2.

Since hot gas of high temperature is supplied to an outer peripheral surface of the turbine blade 33, the outer peripheral surface needs to be cooled. According to the present invention, film cooling is performed through a film cooler 100 capable of supplying cooling air supplied to the inside of the turbine blade 33 to the outer peripheral surface of the turbine blade 33 by mixing the cooling air with the hot gas of high temperature.

To this end, in the present invention, a plurality of film coolers 100 are provided in a surface of the turbine blade 33 from a leading edge 34 to a trailing edge 35, and the cooling air is supplied from the inside of the turbine blade 33 through the film cooler 100. Here, the inside means an internal portion of the turbine blade 33.

The film cooler 100 is positioned in the inside of the turbine blade 33, and an opening shown at the surface of the turbine blade 33 corresponds to an outlet 120 to be described below.

The film cooler 100 according to the present embodiment includes a cooling channel 110 through which the cooling air is introduced and formed in an oval shape, and the outlet 120 extending from one end of the cooling channel 110 to an outer surface of the turbine blade 33 and formed in an oval shape that becomes longer from one end of the cooling channel 110 to the outer surface of the turbine blade 33.

The film cooler 100 performs cooling by mixing the cooling air with the hot gas of high temperature moving along the outer peripheral surface of the turbine blade 33. When supplied toward the outlet 120, the cooling air is stably diffused to decrease high temperature of the hot gas to a predetermined temperature.

In particular, the film cooler 100 minimizes a non-uniform flow caused by a separation phenomenon occurred when the cooling air moves to the outer peripheral surface of the turbine blade 33 through the outlet 120 in improving cooling efficiency. Further, the film cooler 100 allows to perform cooling by constantly supplying a large flow rate of cooling air in constantly maintaining cooling efficiency.

Referring to FIG. 4, in order to minimize the non-uniform flow phenomenon caused by the separation phenomenon as described above, a structure of the film cooler 100 according to the present invention may be changed into an oval-shaped structure in which widths W of the cooling channel 110 and the outlet 120 to be described below are longer than lengths H of the cooling channel 110 and the outlet 120, respectively, thereby implementing efficient cooling of the turbine blade 33.

The cooling channel 110 has one end connected to the inside of the turbine blade 33 so that the cooling air is introduced and the other end extending toward the outside of the turbine blade 33 and formed in an oval shape.

As an example, when an opening height of the cooling channel 110 is H, and a width of the cooling channel 110 is W, a ratio of the width W to the height H may be maintained to be 2.5 to 3 times. The ratio may contribute to improving cooling efficiency, since a wide diffusion angle α may be maintained at the outlet 120 as compared to a circular cross section when the cooling air moves toward the outlet 120 through the cooling channel 110.

The diffusion angle α of the outlet 120 according to the present embodiment, which is defined an angle between an imaginary line extended from a left side of the cooling channel 110 and a left side of the outlet 120, is maintained within a range of 10 to 13°. It is advantageous to maintain the diffusion angle as consistent as possible. However, since a phenomenon that the cooling air is separated in the outlet 120 may occur if the diffusion angle is increased above the range, it may be preferable that the diffusion angle is maintained within the range.

Particularly, in the present embodiment, since the cooling channel 110 is formed in an oval shape, occurrence of separation of the cooling air in the internal area of the outlet 120 may be reduced, and cooling efficiency may be improved. In the related art, since the shape of the cooling channel 110 is a circular shape, the diffusion angle of the outlet 120 is maintained to be 13°. In the present invention, however, since the cooling channel 110 is configured in an oval shape, the diffusion angle may be within the above described range, and the separation phenomenon of the cooling air may also be reduced.

Accordingly, even when the diffusion angle is decreased, the cooling air may be stably supplied toward the turbine blade 33.

When cutting a cross section of the cooling channel 110 and viewing the inside of the cooling channel, since a left side and a right side are formed in an oval shape, occurrence of a crack caused by stress concentration may be significantly decreased, thereby improving structural stability. The cooling channel 110 has an oval cross section rather than a circular cross section, such that generation of hoop stress generated at a circular cross section may be significantly decreased.

Further, the outlet 120 also has an oval cross section, such that problems caused by stress concentration may be significantly decreased like the cooling channel 110.

Therefore, the film cooler 100 may decrease occurrence of a crack due to stress concentration at a left side wall or a right side wall of the cooling channel 110 and the outlet 120 when the cooling air is supplied to the outer peripheral surface of the turbine blade 33.

Figure 5:
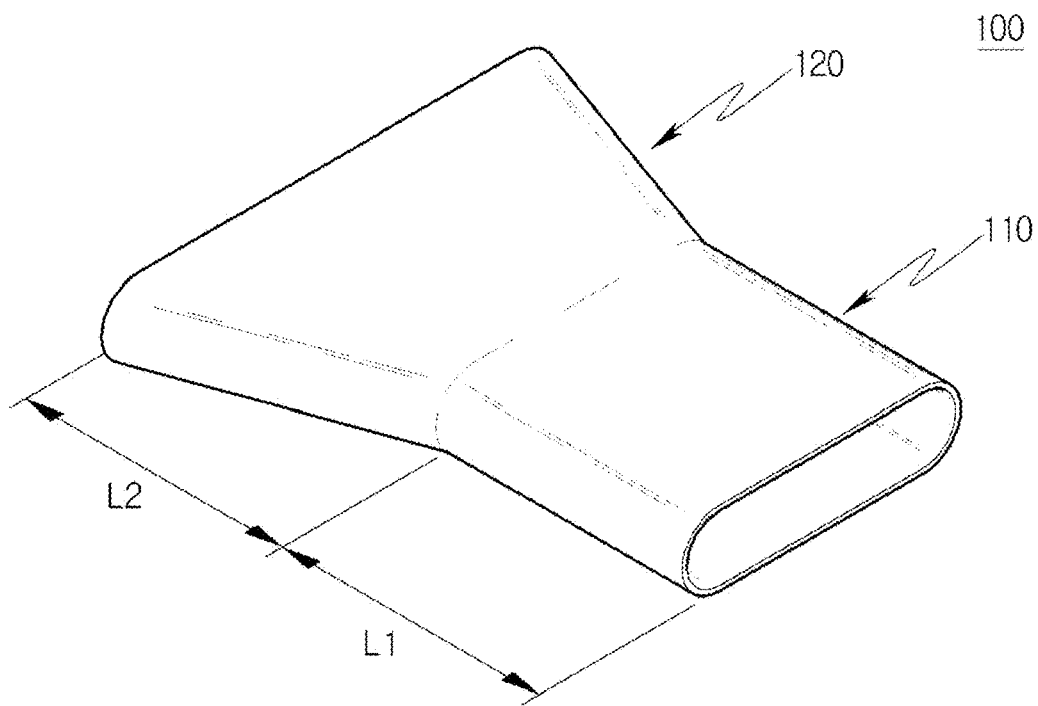
FIGS. 5 to 7 are views illustrating various examples of a cooling channel and an outlet of the film cooler according to the embodiment of the present invention.

Referring to FIG. 5, in the film cooler 100 according to the present embodiment, the cooling channel 110 may extend for a first length L1, and the outlet 120 may extend for a second length L2. As an example, the first and second lengths L1 and L2 may be the same length.

The cooling channel 110 serves to guide a moving direction so that the cooling air may stably move toward the outlet 120. Since the cooling channel 110 is formed to have an oval cross section, a larger flow rate of cooling air as compared to that of the cooling channel having a circular cross section may be supplied to the outlet 120.

If the amount of cooling air is increased, a larger amount of cooling air per unit time may be supplied to the outer peripheral surface of the turbine blade 33, therefore, a larger amount of cooling air is mixed with the hot gas of high temperature to thereby improve efficiency of cooling the turbine blade 33.

Figure 6:
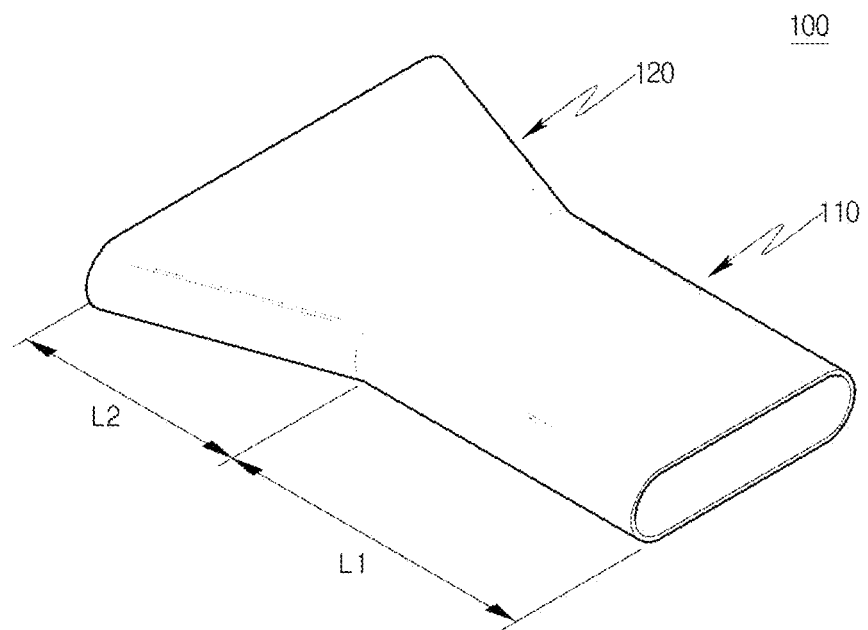

Referring to FIG. 6, in the film cooler 100 according to the present embodiment, the first length L1 of the cooling channel 110 may be relatively longer than the second length L2 of the outlet 120. In case the cooling channel 110 extends to be long, movement stability of the cooling air moving toward the outlet 120 may be improved, such that the cooling air may move toward the outlet 120 in a laminar flow state or in a state in which a flow of the cooling air is stabilized almost like the laminar flow, rather than a turbulent flow state.

In case the cooling air moves to the outlet 120 in the laminar flow state rather than the turbulent flow state, the cooling air is discharged toward the surface of the turbine blade 33 in a state in which the flow of the cooling air is stabilized in the outlet 120. In this case, the turbine blade 33 is cooled by mixing the hot gas of high temperature with the cooling air, and the cooling is performed in a state in which the cooling air moves constantly without generating irregular flow on the surface of the turbine blade 33.

Therefore, the efficiency of cooling the turbine blade 33 may be improved, and the flow of the cooling air moving on the surface of the turbine blade 33 may also be stabilized.

Figure 7:
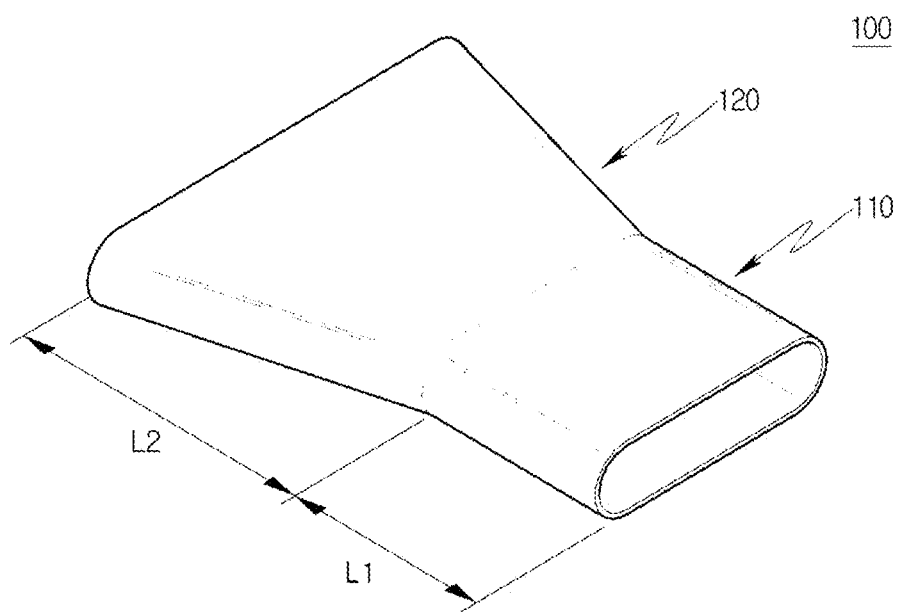

Referring to FIG. 7, in the film cooler 100 according to the present embodiment, the first length L1 of the cooling channel 110 may be relatively shorter than the second length L2 of the outlet 120.

This corresponds to a case of forming the film cooler 100 at a position where a thickness of a wall of the turbine blade 33 is decreased like the trailing edge 35, rather than the leading edge 34 of the turbine blade 33.

The cooling channel 110 and the outlet 120 according to the present embodiment are processed to minimize inner surface roughness, and in this case, the cooling channel 110 and the outlet 120 are processed to have a smooth surface. The cooling air moves while being in contact with inner sides of the cooling channel 110 and the outlet 120 when moving via the inner sides of the cooling channel 110 and the outlet 120, and a flow of the cooling air may be stabilized or changed unstably depending on the inner surface roughness.

For example, as the inner surface roughness of the cooling channel 110 and the outlet 120 is minimized, friction during movement of the cooling air may be significantly decreased, thereby stably maintaining the laminar flow.

Accordingly, the cooling air may stably move toward the surface of the turbine blade 33 along the film cooler 100.

Figure 8:
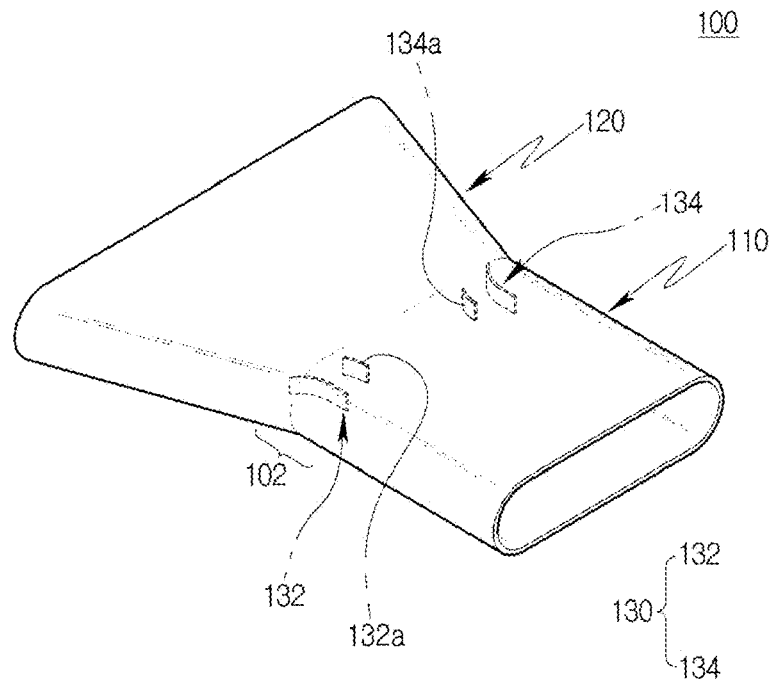
FIGS. 8 and 9 are perspective views illustrating a state in which a guide portion is provided in the film cooler according to the embodiment of the present invention.

Referring to FIG. 8, in the turbine blade 33 according to a first embodiment of the present invention, a width change portion 102, in which a rear end portion of the cooling channel 110 is connected to a front end portion of the outlet 120, is formed between the cooling channel 110 and the outlet 120, and the width of the film cooler 100 is changed at the width change portion 102.

The width change portion 102 is provided with a guide portion 130 extending in a streamline form toward the outlet 120 while being close to a left side and a right side of the width change portion 102 in order to guide a moving direction of the cooling air moving through the cooling channel 110 to a left side and a right side of the width direction of the outlet 120.

The width change portion 102 is a portion where the width is changed, the cooling channel 110 is connected to the outlet 120, and the width is gradually increased. In the width change portion 102, the guide portion 130 is installed to stably guide the movement of the cooling air.

The guide portion 130 is formed in a plate shape having a predetermined thickness, and extends for a predetermined length in the width change portion 102 toward the outlet 120. A height of the guide portion 130 is the same as an inner height of the cooling channel 110 and the outlet 120.

The guide portion 130 includes a first guide portion 132 extending for a first length while facing a left side surface of the width change portion 102, and a second guide portion 134 extending for a second length while facing a right side surface of the width change portion 102. When viewing the film cooler 100 from the top, the first and second guide portions 132 and 134 extend in a straight line form to the rear end portion of the cooling channel 110, and extend to be rounded toward the side surfaces to the front end portion of the outlet 120.

The first and second guide portions 132 and 134 are disposed to be bilaterally symmetrical in relation to the width W of the outlet 120.

The first guide portion 132 and the second guide portion 134 may enable stable movement of the cooling air by guiding the moving direction of the cooling air to the left side surface and the right side surface based on FIG. 8, so that problems caused by separation of the cooling air do not occur in the width change portion 102.

The first guide portion 132 may supply some of the cooling air moving to the outlet 120 through the cooling channel 110 to the left side surface of the outlet 120 to significantly decrease occurrence of a phenomenon that a flow of the cooling air is not uniform in the width change portion 102, and may induce the moving direction of the cooling air to the left side surface to guide stable movement.

The second guide portion 134 may supply some of the cooling air moving to the outlet 120 through the cooling channel 110 to the right side surface of the outlet 120 to significantly decrease occurrence of a phenomenon that a flow of the cooling air is not uniform in the width change portion 102, and may induce the moving direction of the cooling air to the right side surface to guide stable movement.

In this case, the moving direction of the cooling air is guided toward the left side surface and the right side surface, respectively, at positions of the first and second guide portions 132 and 134, and is guided to move straight forward toward the outlet 120 at the central position, based on the width change portion 102.

The first and second guide portions 132 and 134 are disposed to be bilaterally symmetrical in relation to the center in the width direction of the outlet 120. In this case, the cooling air may uniformly move at the left and right side positions, and move straight forward at the central position, thus non-uniform movement or the separation phenomenon does not occur at a specific position, and the cooling air may stably move to the surface of the turbine blade 33.

The first guide portion 132 further includes a first auxiliary guide portion 132a spaced apart from the first guide portion 132 in a width direction and extending for a length shorter than that of the first guide portion 132. The second guide portion 134 further includes a second auxiliary guide portion 134a spaced apart from the second guide portion 134 in the width direction and extending for a length shorter than that of the second guide portion 134.

The first and second auxiliary guide portions 132a and 134a extend for a length shorter than that of the first and second guide portions 132 and 134 as described above, and are spaced apart from the first and second guide portions 132 and 134, respectively, at a predetermined interval.

When viewing the film cooler 100 from the top, the first and second auxiliary guide portions 132a and 134a extend straight forward toward the outlet 120 and then extend to be rounded toward the left side and the right side, respectively, like the first and second guide portions 132 and 134, thus the cooling air may stably move toward the inner left side wall and the inner right side wall in the width change portion 102.

Figure 9:
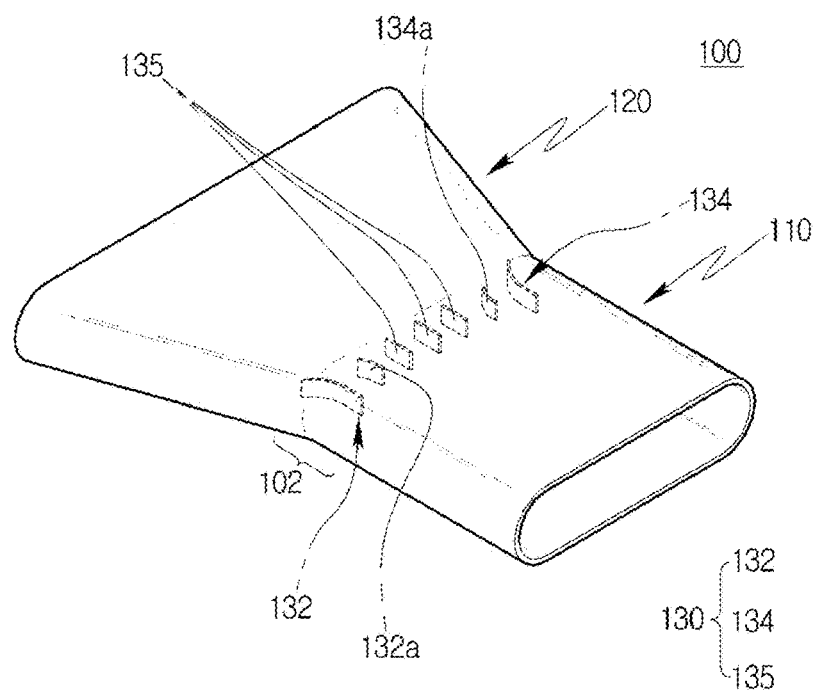

Referring to FIG. 9, a plurality of guide portions 130 according to the present embodiment may be positioned while being spaced apart from each other at a predetermined interval along the width direction of the width change portion 102. In this case, the first and second guide portions 132 and 134, and the first and second auxiliary guide portions 132a and 134a are disposed in the same manner as described above, and a plurality of unit guides 135 extending straight forward toward the outlet 120 are provided at the central position.

The unit guide 135 guides the cooling air moving from the cooling channel 110 toward the outlet 120 to move straight forward at the central position, thereby significantly decreasing occurrence of problems caused by separation.

Figure 10:
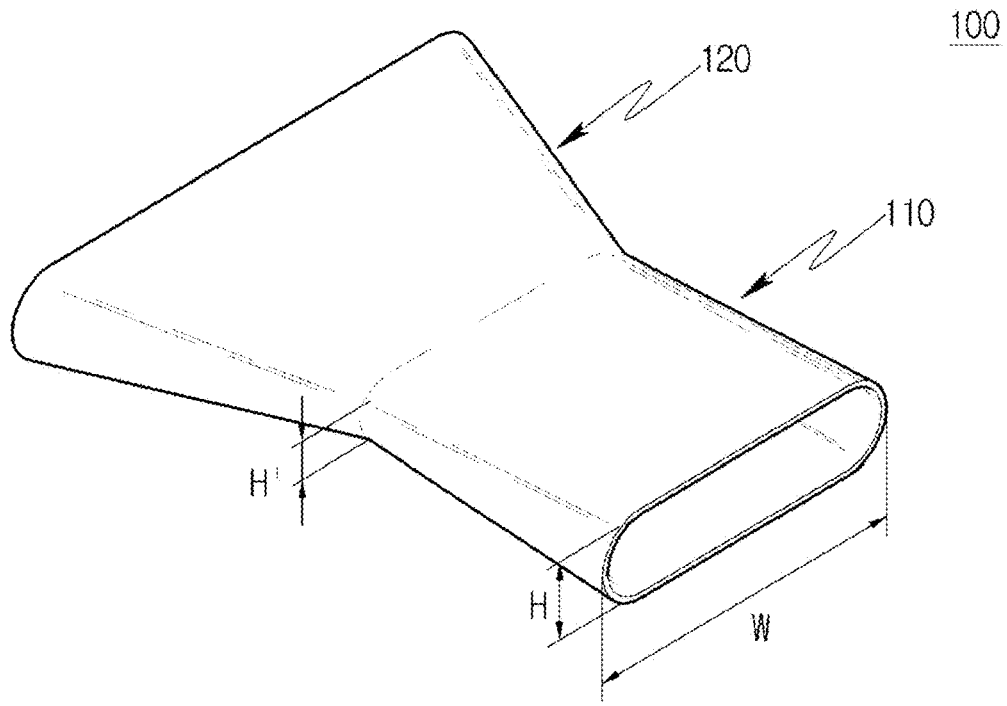
FIG. 10 is a perspective view illustrating an example in which a height of the film cooler according to the embodiment of the present invention is decreased toward the outlet.

Referring to FIG. 10, the cooling channel 110 according to the present embodiment extends so that a height thereof is decreased from a portion of the cooling channel 110 where the cooling air is introduced to a portion thereof adjacent to the outlet 120. That is, a starting height H of the cooling channel 110 is larger than a height H' of the portion adjacent to the outlet 120. When the cooling channel 110 is formed as described above, an area in which the cooling air flows toward the outlet 120 may be decreased, but flux of the cooling air may be increased.

Figure 11:
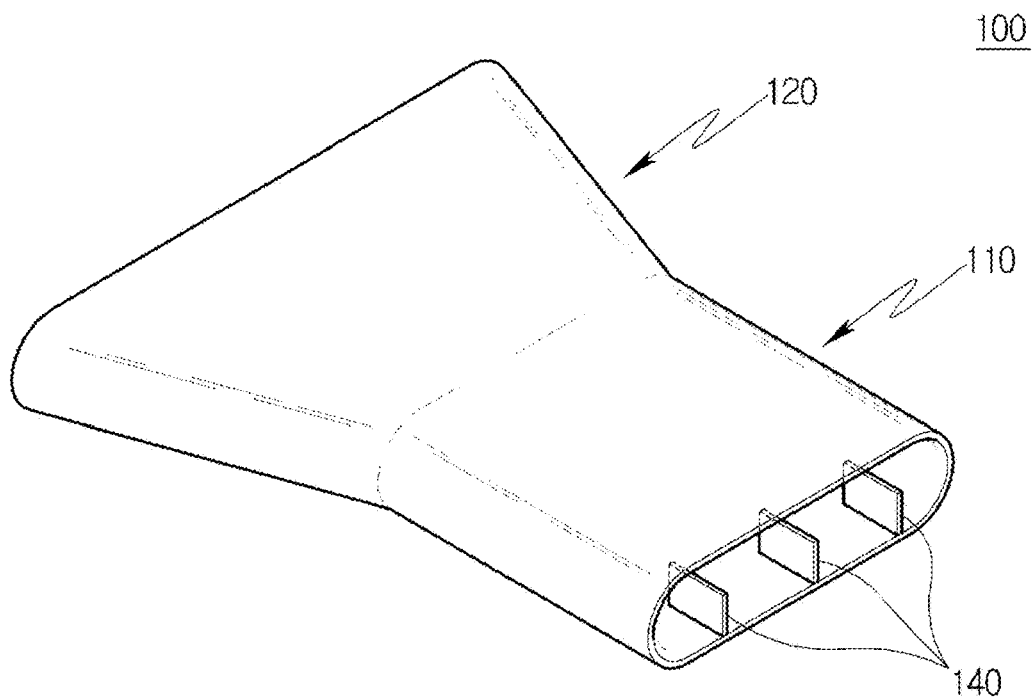
FIGS. 11 and 12 are perspective views illustrating a partition wall installed in the film cooler according to the embodiment of the present invention.
Figure 12:
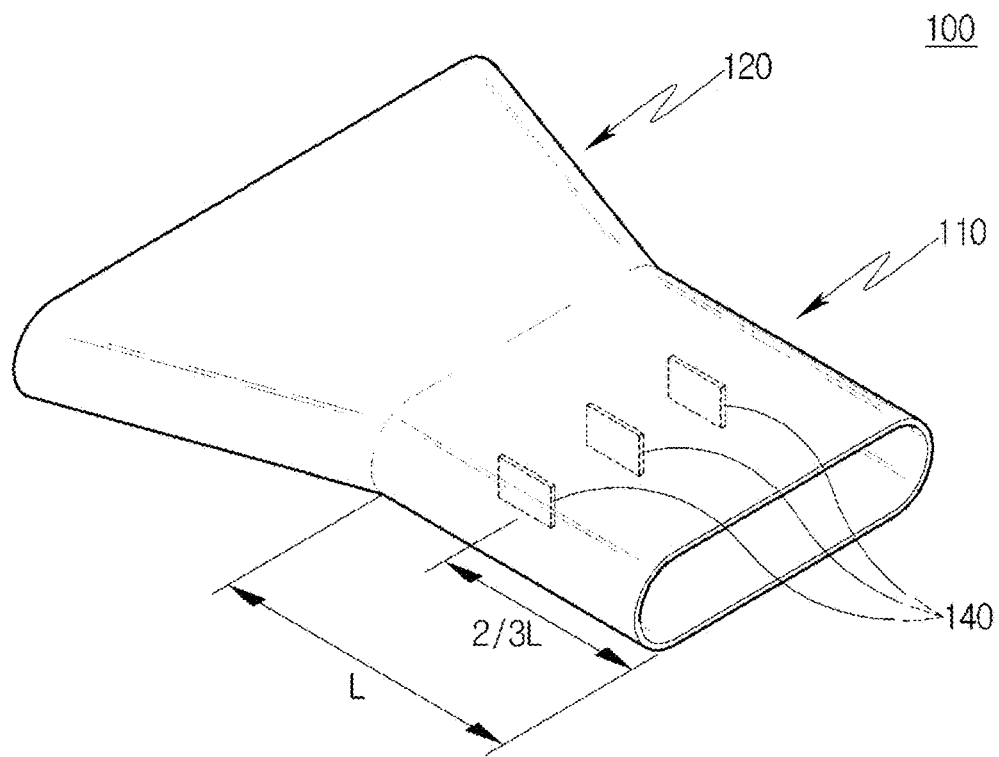

Referring to FIGS. 11 and 12, a plurality of partition walls 140 spaced apart from each other at a left side position and a right side position along the width direction are disposed in the cooling channel 110 according to the present embodiment. The partition walls 140 may be disposed in the inside of the cooling channel 110 at a predetermined interval along the width direction of the cooling channel.

In this case, the partition wall 140 may uniformly partition the inside of the cooling channel 110 in the width direction, thereby guiding the cooling air to the outlet 120 along a region partitioned by the partition wall 140.

Therefore, the cooling air may move toward the outlet 120 in a state in which flow thereof is stably maintained, thereby improving movement stability.

As illustrated in FIG. 12 and the above described embodiment, when a total length of the cooling channel is L, the partition wall 140 is positioned at a position of $\frac{2}{3} \times L$.

The position is a position close to the outlet 120 and corresponds to a position before the cooling air moves to the outlet 120 from the cooling channel 110. In a case of guiding the moving direction of the cooling air at the position, the cooling air moving to the outlet 120 may move in a constant direction.

In this case, the cooling air may stably move to the surface of the turbine blade 33 in the outlet 120 of which the length in the width direction is increased without being separated or unstably flowing.

Figure 13:
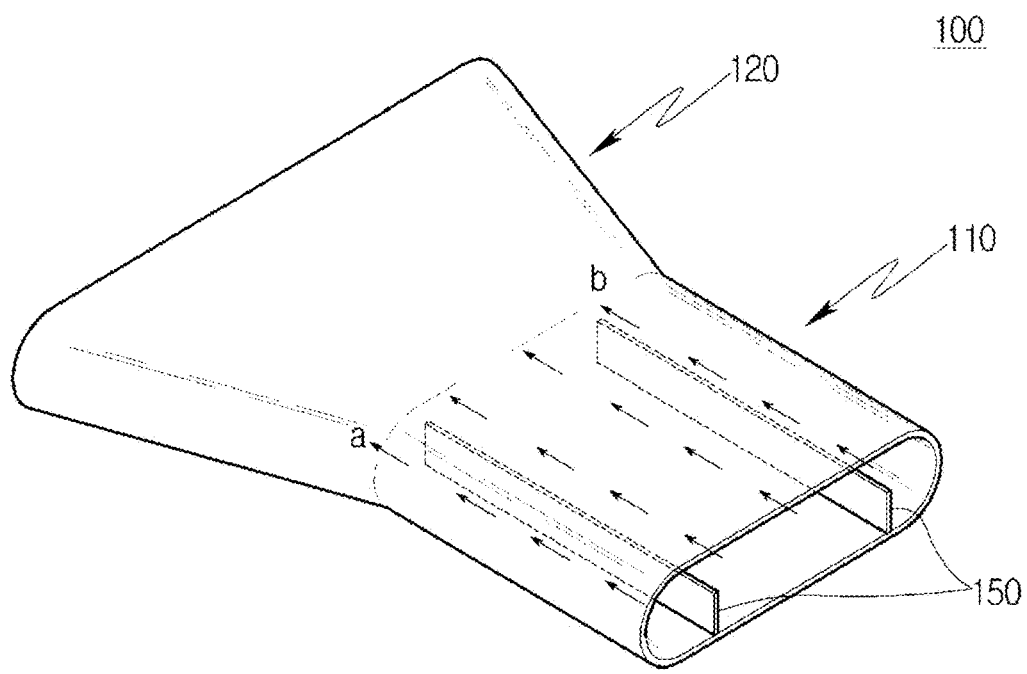
FIGS. 13 to 15 are perspective views illustrating various examples of the partition wall provided in the film cooler of the gas turbine blade according to the embodiment of the present invention.

Referring to FIG. 13, when positioned in the inside of the cooling channel 110, the partition wall 150 is formed in a height section from a bottom surface of the inside of the cooling channel 110 to a top surface of the inside of the cooling channel 110. In this case, the moving direction of the cooling air is guided toward the outlet 120 from the cooling channel 110 by the partition wall 150. Particularly, the cooling air moves toward the outlet 120 independently without being mixed with each other by the partition wall 150 while the cooling air moves toward the outlet 120.

For example, the partition walls 150 may be positioned at left and right positions based on the center in the width direction of the cooling channel 110, respectively, and may extend along the length direction of the cooling channel 110.

If the partition wall 150 extends as described above, since the cooling air may constantly move toward positions a and b, the cooling air stably moves toward the surface of the turbine blade 33 in a state in which the separation phenomenon is significantly decreased.

Therefore, the cooling air may be stably supplied, the flow stability may be secured, and the flow rate of the cooling air may also be constantly maintained.

Figure 14:
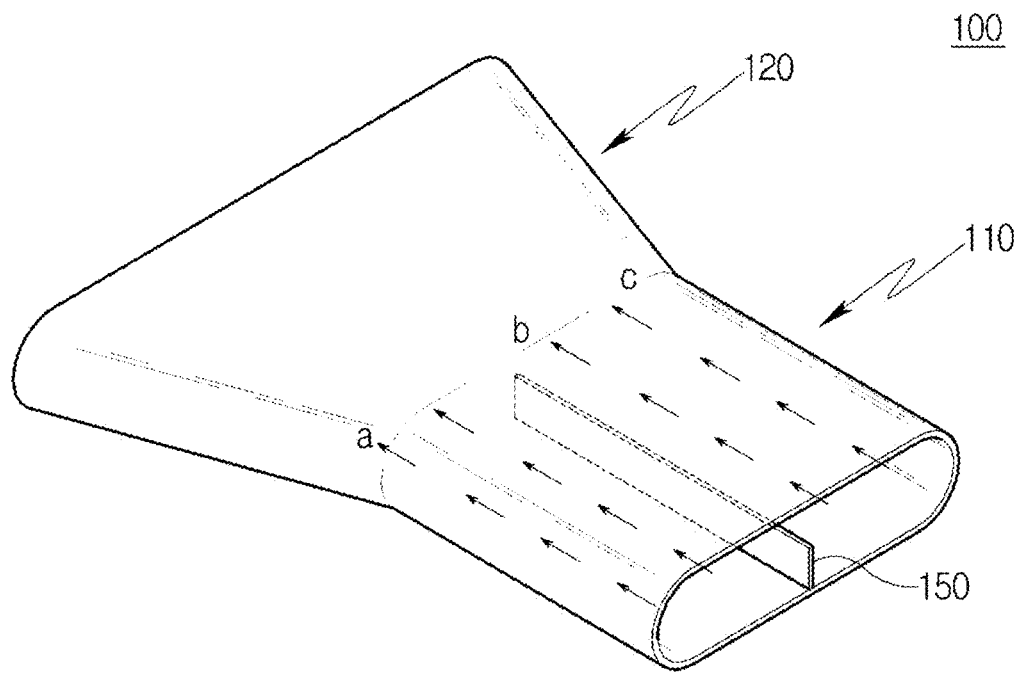

Referring to FIG. 14, the partition wall 150 according to the present embodiment may extend along the length direction of the cooling channel 110 at a central position of the cooling channel 110 in the width direction. In this case, the cooling air stably moves toward positions a to c when moving toward the outlet 120 via the cooling channel 110. Particularly, since the partition wall 150 is positioned at the center, the cooling air may stably move toward the positions a and c.

Figure 15:
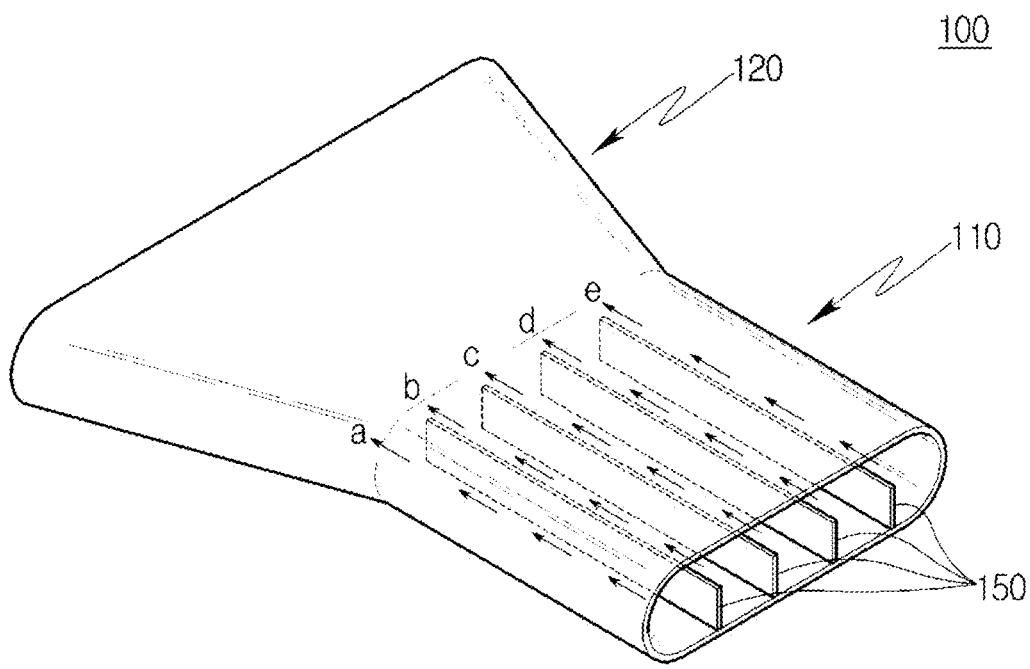

Referring to FIG. 15, a plurality of partition walls 150 according to the present embodiment are spaced apart from each other at a predetermined interval in the length direction of the cooling channel 110 at positions in the width direction of the cooling channel 110, and the cooling air is supplied as illustrated by arrows.

As such, when the cooling air is supplied to positions a to e toward the outlet 120, the separation phenomenon does not occur in a specific position, and the cooling air stably moves toward the surface of the turbine blade 33.

Therefore, the cooling air may be stably supplied, the flow stability may be secured, and the flow rate of the cooling air may also be constantly maintained.

Figure 16:
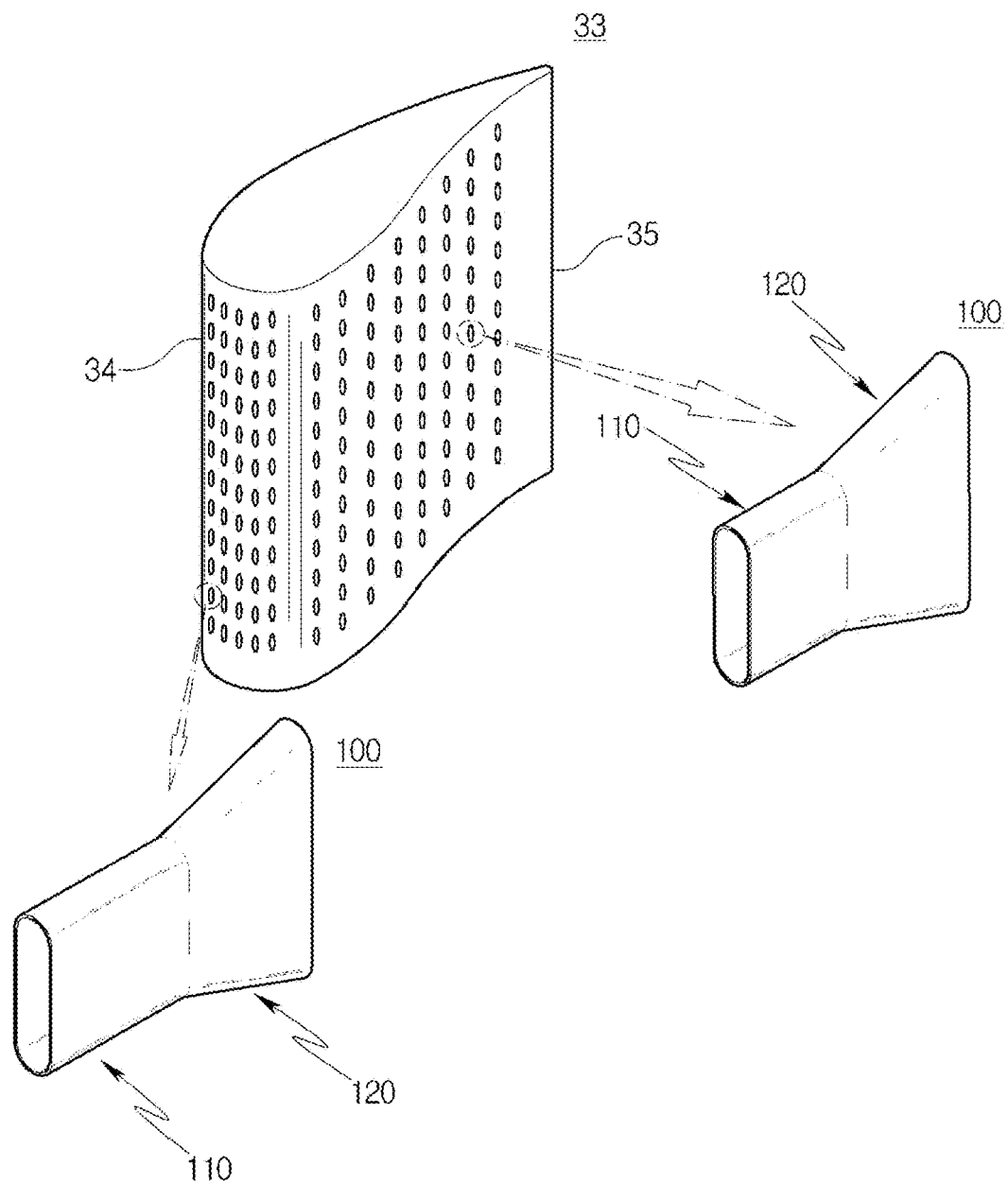
FIG. 16 is a perspective view illustrating a length change of the cooling channel depending on an installation position of the film cooler according to the embodiment of the present invention.

Referring to FIG. 16, a length of each cooling channel 110 according to the present embodiment may be decreased from the leading edge 34 toward the trailing edge 35.

In the turbine blade 33, when hot gas of high temperature is supplied, the hot gas first contacts the leading edge 34, moves along the outer peripheral surface, and then moves to the trailing edge 35.

The hot gas is cooled by the cooling air discharged through the film cooler 100 to the surface of the turbine blade 33 at the leading edge 34, and a temperature thereof is decreased to a predetermined temperature while continuously moving toward the trailing edge 35.

In this case, even when an amount of cooling air discharged at the trailing edge 35 is smaller than that of the cooling air discharged at the leading edge 34 or a temperature of the cooling air is slightly higher than that of the cooling air discharged at the leading edge 34, there is no particular influence on cooling performance of the turbine blade 33.

Accordingly, the cooling channel 110 formed in the film cooler 100 may enable stable cooling even when the length of the cooling channel 110 positioned at the trailing edge 35 is shorter than that of the cooling channel 110 positioned at the leading edge 34.

Figure 17:
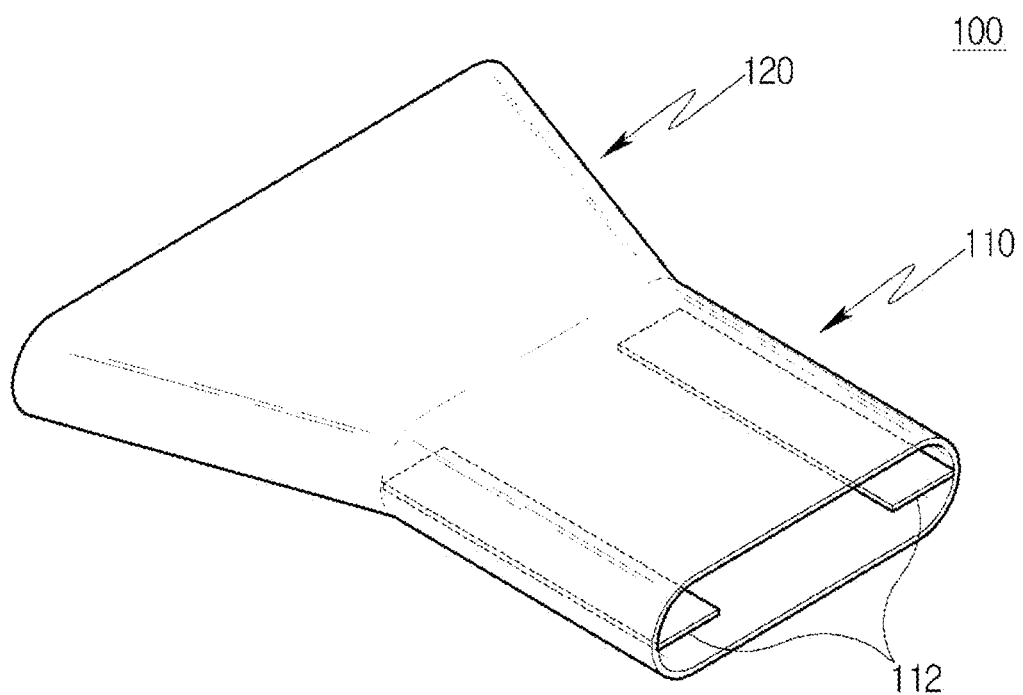
FIG. 17 is a perspective view illustrating a separating plate installed in the film cooler of the gas turbine blade according to the embodiment of the present invention.

Referring to FIG. 17, the cooling channel 110 according to the present embodiment is provided with separating plates 112 extending along the length direction of the cooling channel 110 at a left side wall and a right side wall in the inside of the cooling channel 110 that is rounded in an oval shape. The separating plate 112 is provided to secure movement stability of the cooling air moving along the left side wall and the right side wall of the cooling channel 110 that is rounded in the oval shape. A vortex due to an eddy may be generated at the left side wall and the right side wall while the cooling air moves, however, movement of the cooling air to the outlet 120 is stabilized by the separating plate 112.

Therefore, the cooling air may be stably discharged at the outlet 120, and cool the surface of the turbine blade 33 by being mixed with hot gas after moving to the surface of the turbine blade 33.

According to the present embodiment, the turbine blade 33 manufactured by a method for manufacturing the turbine blade 33 including the partition walls 140 and 150 may be installed in the gas turbine and used. In this case, an expensive turbine blade 33 may be safely used even in the high temperature condition.

In the gas turbine according to the present embodiment in which the combustor 2 is provided in front of the turbine blade 33, and the compressor 10 is provided in front of the combustor 2, the compressed air compressed in the compressor 10 is supplied to the combustor 2 and then supplied to the turbine 3 after being combusted with fuel.

The turbine blade 33 is cooled by the cooling air, thus is stably cooled under a high temperature condition to thereby be stably used even when the turbine is operated for a long time.

According to the embodiments of the present invention, since a wide outlet area may be secured even when the extension angle of the outlet of the film cooler is maintained at a specific angle or less, it is possible to improve efficiency of film cooling of the turbine blade through increase in an amount of cooling air.

According to the embodiments of the present invention, separation or non-uniform flow in the film cooler may be significantly decreased, thereby improving flow stability of the cooling air.

According to the embodiments of the present invention, since the cross sections of the cooling channel and the outlet have an oval shape, it is possible to significantly decrease occurrence of deformation due to stress concentration.

What is claimed is:

1. A gas turbine blade including an airfoil formed between a leading edge and a trailing edge of the turbine blade and a plurality of film coolers formed in an outer surface of the airfoil, each film cooler comprising:
    a cooling channel through which cooling air is introduced;
    an outlet extending from one end of the cooling channel to the outer surface of the turbine blade; and
    a guide disposed in a width change portion of the film cooler where a width of the film cooler changes from a width of the cooling channel to a width of the outlet that is wider than the width of the cooling channel, the width change portion consisting of a cooling channel portion occupying a first region of the film cooler next to the outlet and an outlet portion occupying a second region of the film cooler next to the cooling channel, wherein the guide has a plate shape having straight sides respectively contacting opposite inner walls of the cooling channel and a concavely curved face configured to guide a direction of the cooling air entering the first region such that the cooling air entering the first region is guided into the second region and is guided outwardly in a width direction of the width change portion.

2. The gas turbine blade of claim 1, wherein the cooling channel and the outlet extend for the same length.

3. The gas turbine blade of claim 1, wherein the cooling channel extends for a length longer than that of the outlet.

4. The gas turbine blade of claim 1, wherein the cooling channel extends for a length shorter than that of the outlet.

5. The gas turbine blade of claim 1, wherein when an opening height of the cooling channel is H, and a width of the cooling channel is W, a ratio of the width W to the height H is maintained to be 2.5 to 3 times.

6. The gas turbine blade of claim 1, wherein the cooling channel and the outlet are processed to have a smooth inner surface.

7. The gas turbine blade of claim 1, wherein a diffusion angle of the outlet extended from a left side and a right side of the cooling channel is maintained within a range of 10° to 13°.

8. A gas turbine, comprising: a combustor provided in front of the turbine blade of claim 1, and a compressor provided in front of the combustor.

9. The gas turbine blade of claim 1, wherein the guide is disposed in the cooling channel portion of the width change portion and includes first and second guide portions extending from the cooling channel portion of the width change portion outwardly in the width direction of the width change portion to the outlet portion of the width change portion.

10. The gas turbine blade of claim 9, wherein the guide further includes a first auxiliary guide portion having an outer concavely curved surface that is spaced apart from an inner convexly curved surface of the first guide portion in the width direction of the width change portion; and a second auxiliary guide portion having an outer concavely curved surface that is spaced apart from an inner convexly curved surface of the second guide portion in the width direction of the width change portion, wherein the first and second auxiliary guide portions each extend outwardly in the width direction of the width change portion to the outlet portion of the width change portion and have a length shorter than that of either of the first and second guide portions.

11. The gas turbine blade of claim 9, wherein the first and second guide portions are separated from each other in the width direction of the width change portion, such that the first guide portion is disposed in a left region of the cooling channel portion next to a left wall of the cooling channel and the second guide portion is disposed in a right region of the cooling channel portion next to a right wall of the cooling channel opposite the left wall and such that the first and second guide portions are not disposed in a central region of the cooling channel portion between the left and right regions, and wherein the first guide portion is configured to guide the direction of the cooling air entering the first region such that the cooling air entering the first region is guided into the second region and is guided outwardly from the left region of the cooling channel, and the second guide portion is configured to guide the direction of the cooling air entering the first region such that the cooling air entering the first region is guided into the second region and is guided outwardly from the right region of the cooling channel.

12. The gas turbine blade of claim 11, wherein guide further includes a plurality of unit guide portions disposed in the central region of the cooling channel and spaced apart from each other at a predetermined interval in the width direction of the width change portion, each unit guide extending straight toward the outlet portion of the width change portion such that the cooling air moving in the central region of the cooling channel is directed straight forward.

13. The gas turbine blade of claim 1, wherein each of the cooling channel and the outlet has a cross-section having an oblong shape including two flat sides and two rounded ends, and wherein the guide is arranged around two lines of symmetry passing through the cross-section.

* * * * *